United States Patent
Okamoto et al.

[11] Patent Number: 5,825,445
[45] Date of Patent: Oct. 20, 1998

[54] ELECTROOPTICAL LIQUID CRYSTAL DEVICE

[75] Inventors: Masumi Okamoto; Masato Shoji; Yasuharu Tanaka; Masahito Ishikawa; Nobuko Fukuoka; Toshihiro Ninomiya; Tsuyoshi Ohyama, all of Kanagawa-ken; Norihiro Yoshida, Tokyo; Hitoshi Hatoh, Kanagawa-ken, all of Japan

[73] Assignee: Kabushiki Kaisha Toshiba, Kawasaki, Japan

[21] Appl. No.: 725,897

[22] Filed: Oct. 4, 1996

[30] Foreign Application Priority Data

Oct. 6, 1995 [JP] Japan .................................. 7-259980

[51] Int. Cl.$^6$ .................................................. G06F 1/1335
[52] U.S. Cl. .......................................... 349/118; 349/119
[58] Field of Search ..................................... 349/118, 119, 349/120

[56] References Cited

U.S. PATENT DOCUMENTS

| | | | |
|---|---|---|---|
| 5,245,456 | 9/1993 | Yoshimi et al. | 349/118 |
| 5,585,950 | 12/1996 | Nishino et al. | 349/118 |
| 5,587,821 | 12/1996 | Nakanishi et al. | 349/118 |
| 5,594,568 | 1/1997 | Abileah et al. | 349/120 |

OTHER PUBLICATIONS

Miyashita, et al: "Wide viewing angle display mode for active matrix LCD using bend alignment liquid crystal cell", Eurodisplay '93 Digest (1993), pp. 149–152.

*Primary Examiner*—William L. Skies
*Assistant Examiner*—Tiep H. Nguyen
*Attorney, Agent, or Firm*—Cushman Darby & Cushman IP Group of Pillsbury Madison & Sutro, LLP

[57] ABSTRACT

In an electooptical liquid crystal device comprising an OCB mode liquid crystal cell and an optically anisotropic element compensating a viewing angle characteristics of the cell, the optically anisotropic element satisfies the elliptical coefficient Z of the index ellipsoid of the optically anisotropic element, $7 \leq Z \leq 10$, if $Z = (ndx - ndz)/(ndx - ndy)$, where ndx, ndy and ndz represent the components in x, y and z directions of the products of the refractive indice n of optically anisotropic element and the thickness of the optically anisotropic element, when the optically anisotropic element is combined with the bend-aligned liquid crystal cell as the electrooptical liquid crystal device.

22 Claims, 11 Drawing Sheets

ELECTROOPTICAL LIQUID CRYSTAL DEVICE

BACKGROUND OF THE INVENTION

1. Field of the Invention

The present invention relates to an electrooptical liquid crystal device, and more specifically to a high speed response electrooptical liquid crystal device.

2. Description of the Prior Art

OCB (optically compensated bend) mode liquid crystal devices provide an electrooptical liquid crystal device that supports a high speed response.

The OCB mode liquid crystal device (LCD) shown in FIG. 2a comprises a liquid crystal cell 50 wherein two substrates 51 and 52 have electrodes 51a and 52a disposed on their main planes with a liquid crystal layer 53 sandwiched between the two substrates, two polarizing plates 60 arranged so as to sandwich said liquid crystal cell 50, and an optically anisotropic element 70 disposed between the polarizing plates 60 and the liquid crystal cell 50.

As shown in FIG. 2(b), said liquid crystal layer 53 comprises the first liquid crystal layer area A containing such plural liquid crystal molecules 53a in the liquid crystal molecules of the liquid crystal layer 53 as come in contact with one of the two substrate 51, the second liquid crystal layer area B consisting of such plural liquid crystal molecules 53b in the liquid crystal molecules of the liquid crystal layer 53 as come in contact with the other of the two substrates 52, and the third liquid crystal layer area C containing such plural liquid crystal molecules as sandwiched between the first liquid crystal layer area A and the second liquid crystal layer area B. The liquid crystal molecules of the liquid crystal layer take such aligned forms as shown in FIG. 2(a), (b) and (c) in terms of the voltage to be applied on the electrodes.

In the liquid crystal layer of OCB mode, the two substrates have the liquid crystal molecules alignment orientation on their planes in the same direction. When no voltage is applied on the electrodes, the liquid crystal layer presents such splay alignment as shown in FIG. 2(a). When a voltage is applied onto the electrodes, the layer takes such bend alignment as shown in FIG. 2(b) where part of the liquid crystal molecules 53c1 in the third liquid crystal layer C are disposed nearly parallel to the line normal to the substrates. When further voltage is applied thereon, the liquid crystal molecules 53c2 and 53c3 in the third liquid crystal layer C align themselves in substantially parallel direction to the line normal to the substrates as shown in FIG. 2(c). The OCB mode is a birefringent effect type liquid crystal display mode wherein the display is made between respective applied voltages in the states of FIG. 2(b) and (c) with the phase difference in the liquid crystal layer changing by the control of voltage. Reportedly, the response speed of this OCB mode is several microseconds (ms).

The alignment of the liquid crystal molecules while in this mode is such that the upper half and the lower half of the liquid crystal are almost always symmetrical to each other. In the range of a viewing angle (observation) that is parallel to the plane where the liquid crystal molecules align themselves, the upper part of the liquid crystal becomes almost symmetrical to the lower part. In this case, the index ellipsoid of the liquid crystal layer becomes spherical. Thus, the viewing angle dependency approaches zero within this range allowing a wider angle.

However, in a viewing angle that is not parallel to the array plane of the liquid crystals, the index ellipsoid of the liquid crystal layer cannot be spherical. The ellipsoid ends by being deformed in terms of the observation angle thereby causing viewing angle dependency.

It has been reported that such problems may be resolved by adding an optically anisotropic element having two optical axes with optimized refractive index in the direction of thickness (Miyashita et al., Eurodisplay 1993, pp. 149–152).

A normally white mode display with a black display on the higher voltage side provides a good dark state in the OCB mode. This black display makes use of the status of substantially raised liquid crystal molecules with voltage applied wherein the liquid crystal molecules 53c of the third liquid crystal layer area C arrange themselves substantially parallel to the normal of the substrates as shown in FIG. 2(c). Under this condition, the phase difference of the liquid crystal layer is relatively small, which affords excellent uniformity of the black color obtained from an orthogonal intersection of the polarizers.

As has been described, the LCD (liquid crystal display) having a wide viewing angle and high speed response, and the normally white mode for good dark state is preferable. When compensating for the viewing angle, it is essential to select an optically anisotropic element that makes the index ellipsoid of liquid crystal layer into a sphere.

SUMMARY OF THE INVENTION

One object of the present invention is to provide an electrooptical liquid crystal device having an optically anisotropic element most suited to the OCB mode with a normally white display and to any mode similar thereto.

The mode similar to the OCB mode means, in this context, any electrooptical liquid crystal device wherein the liquid crystal layer has an array of partial liquid crystal molecules at the center of the third liquid crystal layer area C that are almost parallel to the line normal to the substrates without any applied voltage. When further voltage is applied thereon, the liquid crystal molecules of the third liquid crystal layer area C on the sides of the areas A and B, arrange themselves almost parallel to the line normal to the substrates. For example, an insertion of liquid crystals with chirality into a liquid crystal cell aligned in the same fashion as in the OCB mode will give a uniform 10 deg. twisted array when no voltage is applied. If a large voltage is applied onto such an array, the bend alignment can be easily achieved.

According to an aspect of the electrooptical liquid crystal device, the bend-aligned liquid crystal cell includes a liquid crystal layer with molecular twisted alignment at its center and the optically anisotropic element reduces the viewing angle dependency of the bend-aligned liquid crystal cell.

The optically anisotropic element has an elliptical coefficient:

$$7 \leq Z \leq 10, \text{ if } Z=(n_x d-n_z d)/(n_x d-n_y d)$$

where $n_x d$, $n_y d$ and $n_z d$ represent the refractive index components in x, y and z directions respectively of the total sum of the products of the refractive indices of the optically anisotropic element and the thickness (unit: $\mu$, m) of the optically anisotropic element in the direction normal to the substrates when the substrates and the optically anisotropic elements are arranged parallel to each other. The symbols n and d represent the refractive index and thickness respectively. They are total sums of the indices and thicknesses respectively when there are plural optically anisotropic elements. The $n_x d$ and $n_y d$, which are perpendicular to each other, represent the refractive index components of the optically anisotropic elements in the in-plane direction x-y of the plane substantially perpendicular to the thickness direction z of the optically anisotropic elements. The symbol $n_z d$ represents the refractive index components of the optically anisotropic elements in the thickness direction z thereof.

That is, the liquid crystal layer of the bend-aligned liquid crystal cell in the electrooptical liquid crystal device comprises the first liquid crystal layer area containing such plural liquid crystal molecules in the liquid crystal molecules of the liquid crystal layer as come in contact with one of the two substrates, the second liquid crystal layer area containing such plural liquid crystal molecules in the liquid crystal molecules of the liquid crystal layer as come in contact with the other of the two substrates, and the third liquid crystal layer area containing such plural liquid crystal molecules as sandwiched between the first liquid crystal layer area and the second liquid crystal layer area.

When the first voltage is applied to the electrodes, the liquid crystal layer has such an alignment that the slant of part of the liquid crystal molecules becomes almost parallel to the normal line to the substrates in the third liquid crystal layer area, while in the second voltage application the liquid crystal layer has such an alignment that the slant of the plural liquid crystal molecules run parallel to the line normal to the substrates in the third liquid crystal layer area.

The optically anisotropic element has characteristics that it compensates the optical anisotropy of the components in the thickness direction of the liquid crystal layer as sandwiched by the two substrates when the second voltage is applied in a direction slanted to the line normal to the substrates. In the OCB mode according to this invention and any OCB mode similar thereto, any liquid crystal molecules except those near the substrates run substantially parallel to the line normal to the substrate when the second voltage is applied. Therefore, the refractive index anisotropy of the optical anisotropic components is extremely large in the direction normal to the substrates, that is in the thickness direction of the liquid crystal layer. In the present invention the optically anisotropic element compensates the optical anisotropy of such thickness components of the liquid crystal layer in the direction slanted against the line normal to the substrates.

DESCRIPTION OF THE PREFERRED EMBODIMENTS

FIG. 1 depicts the molecular alignment of the liquid crystal layer of this invention giving an actual embodiment of the electrooptical liquid crystal device in a mode similar to the OCB mode.

Figure 1A:
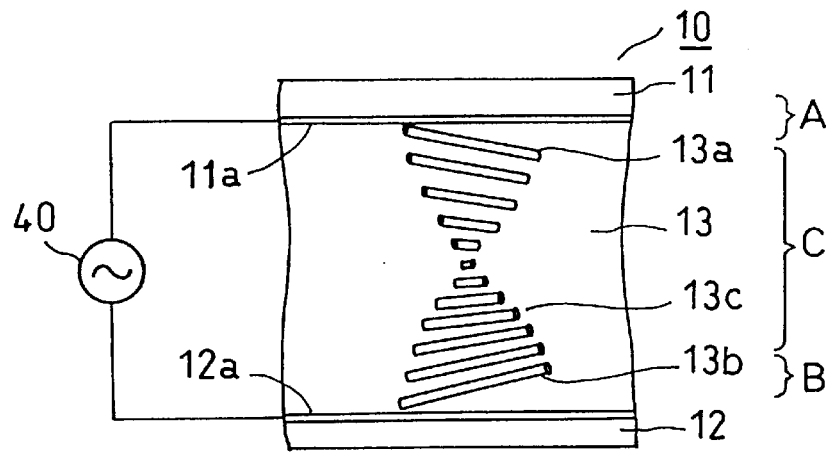
FIG. 1a through FIG. 1c are schematic cross sectional views illustrating an embodiment of this invention.

As shown in FIG. 1a, the liquid crystal layer 13 containing plural liquid crystal molecules comprises the first liquid crystal layer area A having plural liquid crystal molecules 13a in contact with the substrate 11 having an electrode 11a, the second liquid crystal layer area B having plural liquid crystal molecules 13b in contact with the other substrate 12 having an electrode 12a, and such liquid crystal layer area C having plural liquid crystal molecules 13c sandwiched between the first liquid crystal layer area A and the second liquid crystal layer area B.

Figure 1B:
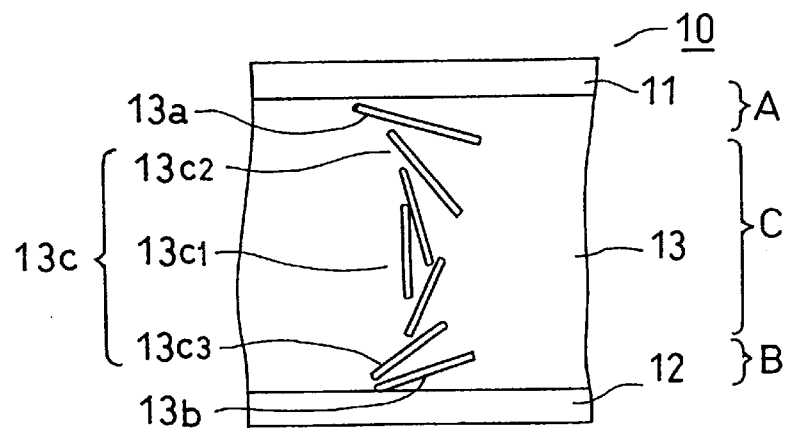

FIG. 1a shows the alignment of the liquid crystal molecules when no voltage is applied to the electrodes; FIG. 1b shows the alignment of the liquid crystal molecules when a first voltage is applied to the electrodes; and FIG. 1c shows the alignment of the liquid crystal molecules when the second voltage is applied.

As shown in FIG. 1a, when no voltage is applied to the electrodes 11a and 12a from the voltage drive source 40 connected to the electrodes, the plural liquid crystal molecules 13c in the third liquid crystal layer area C are parallel to each other and are twist-arranged in the in-plane direction of the two substrates.

When the first voltage is applied to the electrodes 11a and 12a, the slant of part of the liquid crystal molecules 13c1 at the center of the liquid crystal layer among the plural liquid crystal molecules in the third liquid crystal layer area C becomes substantially parallel to the line normal to the substrates as shown in FIG. 1b. The first voltage application signifies the status shift from the liquid crystal cell where the liquid crystal molecules under a threshold or higher voltage are almost parallel to the line normal to the substrate, that is where the liquid crystal molecules begin to rise up, into another status when a still larger voltage is applied to the liquid crystal layer.

Figure 1C:
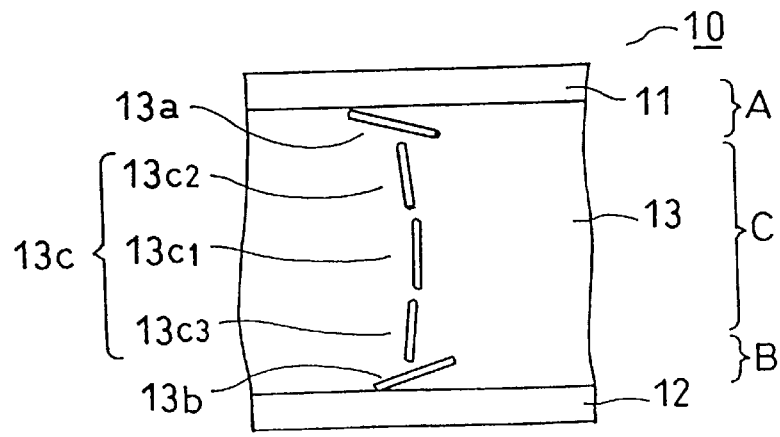
Figure 2A:
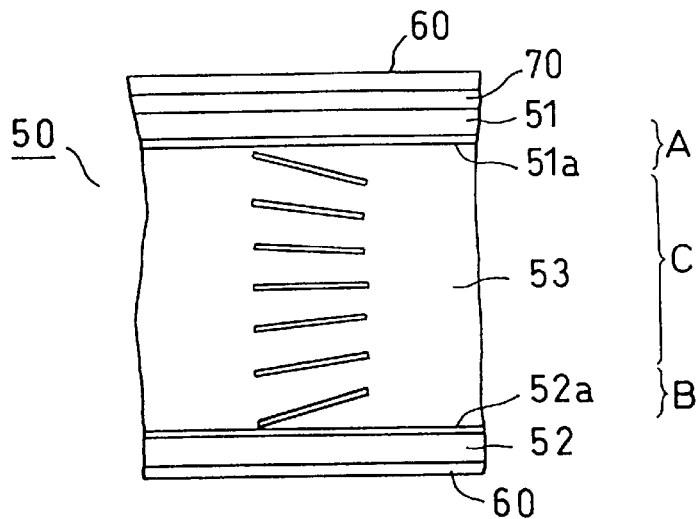
FIG. 2a through FIG. 2c are schematic cross sectional views depicting the liquid crystal cell of the electrooptical liquid crystal device in the conventional OCB mode.
Figure 2B:
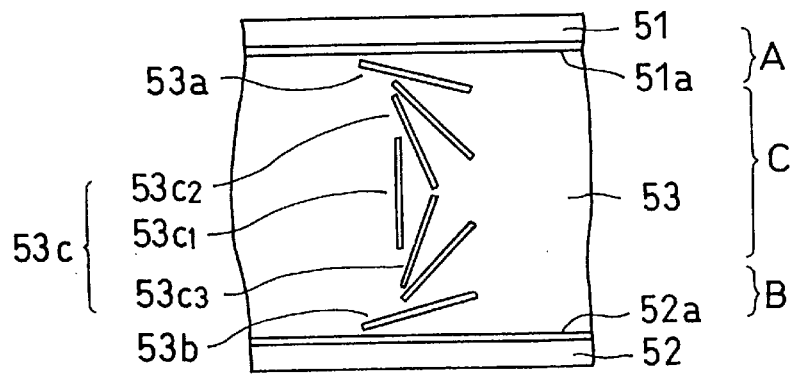
Figure 2C:
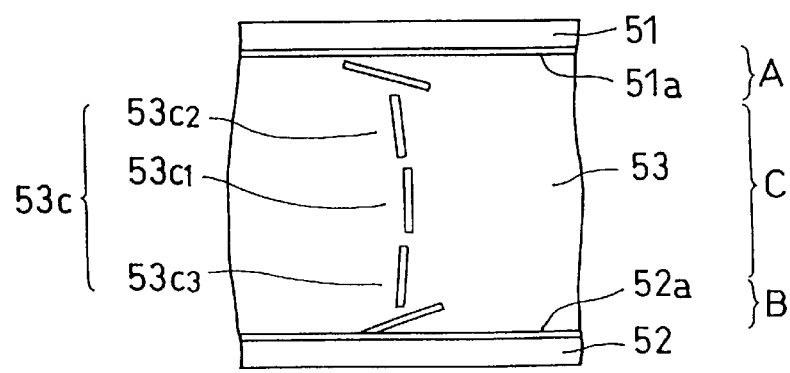

As shown in FIG. 1c, when the second voltage is applied to the electrodes 11a and 12a, the slant of the liquid crystal molecules 13c2 and 13c3 near the electrodes in the third liquid crystal layer area comes substantially parallel to the normal of the substrates. This second applied voltage is higher than the first voltage, and the liquid crystal molecules 13c2 and 13c3 in the third liquid crystal layer area go almost parallel to the normal of the substrates, that is the liquid crystal molecules have risen up.

Figure 4:
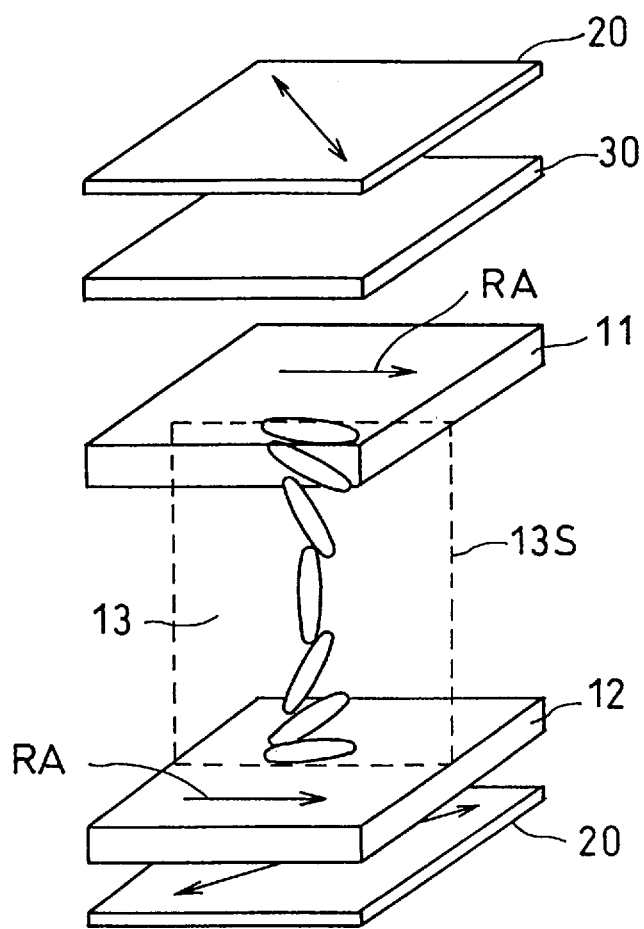
FIG. 4 is a perspective diagram illustrating the operation of an embodiment according to the present invention.

Both in the OCB mode and any mode analogous thereto, the upper and lower halves of the liquid crystal layer present quasi synmmetrical bend alignment near the middle portion in the thickness direction of the liquid crystal layer that sandwiches the liquid crystal layer 13 between the two substrates 11 and 12. Consequently, in the range of viewing angle (observation angle) where the liquid crystal molecules become substantially parallel to the planes arranging themselves in the thickness direction as shown in FIG. 4, the upper and lower halves of the liquid crystals take substantially symmetrical forms. The index ellipsoid the optical anisotropy of the liquid crystal layer becomes spherical in this case. Within this range, therefore, the viewing angle dependency hardly exists, resulting in a wider angle. With any viewing angle not parallel to the planes as shown in FIG. 4, on the other hand, the index ellipsoid of the liquid crystal layer does not become spherical but deforms in terms of the observation angle, thus causing the viewing angle dependency.

This invention compensates the optical anisotropy of such a liquid crystal layer to give a wider viewing angle.

That is, the electrooptical liquid crystal device of this invention includes an optically anisotropic element of negative optical anisotropy having two optical axes with the following Z value of optical index coefficient, i.e., elliptical coefficient, $$7 \leq Z \leq 10, \text{ if } Z=(n_x d - d)/(n_x d - n_y d)$$

where $n_x d$, $n_y d$ and $n_z d$ represent the refractive index components in x, y and z directions respectively of the total sum of the products of the refractive indices of the optically anisotropic elements and the thickness (unit: $\mu$m) of the optically anisotropic elements in the direction of the normal to the substrates when the substrates and the optically anisotropic elements are disposed parallel to each other. The $n_x d$ and $n_y d$, which are perpendicular to each other, represent the refractive index components of the optically anisotropic elements in the in-plane direction of the plane substantially perpendicular to the thickness direction of the optically anisotropic elements. The symbol $n_z d$ represents the refractive index components of the optically anisotropic elements in the thickness direction thereof.

Figure 5:
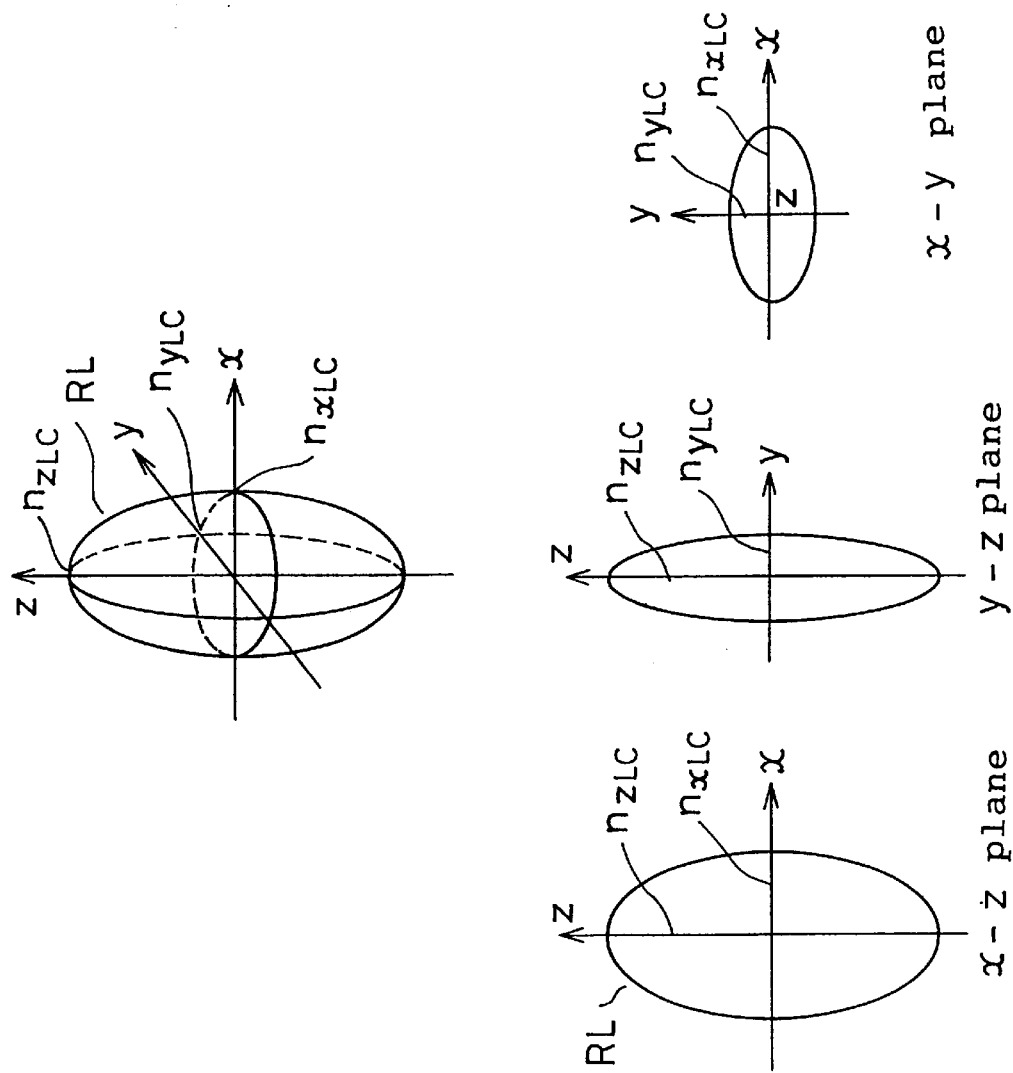
FIG. 5 is a diagram illustrating the index ellipsoid of the liquid crystal cell used in this invention.

The index ellipsoid equivalent thereto where the liquid crystal layers of the liquid crystal cell are aligned as shown in FIG. 4 satisfies the following inequality:

$$n_{ZLC} > n_{XLC} > n_{YLC}$$

as shown in FIG. 5, forming the shape of a Rugby ball compressed in y direction as is clear from the respective cross sectional planes x-z, y-z and x-y of the ellipsoid RL in FIG. 5.

Figure 6:
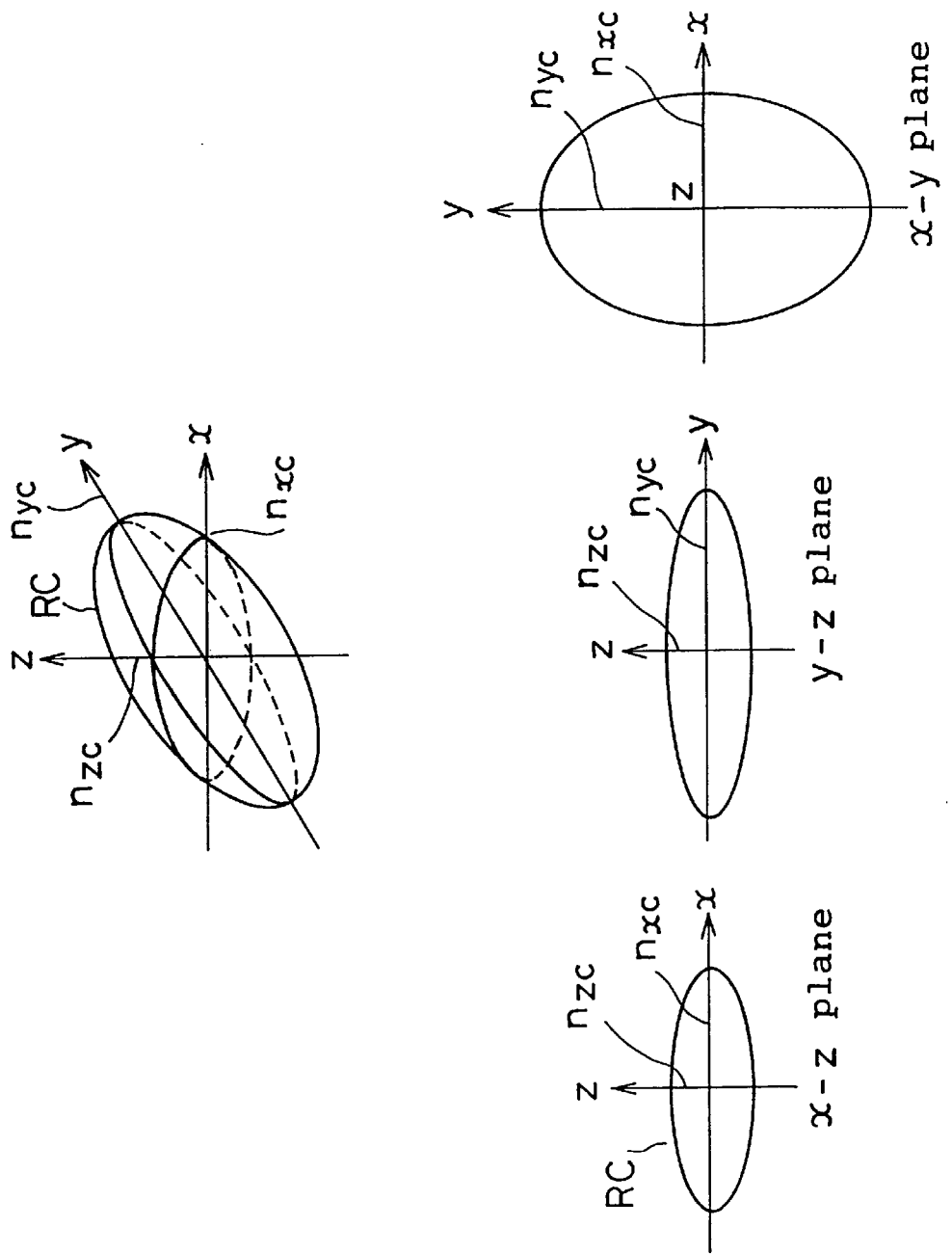
FIG. 6 is a diagram illustrating the index ellipsoid of the optically anisotropic element used in this invention.

As shown in FIG. 6, the index ellipsoid RC of the optically anisotropic elements that compensate this deformation will preferably take the form of another Rugby ball which is more compressed in the direction of longer axis z than in other two axes and longer only in y direction.

This index ellipsoid can be expressed by the following refractive index formula:

$$Z=(n_{xc}-n_{zc})/(n_{xc}-n_{yc})$$

where $n_{zc} < n_{xc} < n_{yc}$.

Here the size of $n_z$ depends on the pretilt angle, that is, the slant of the liquid crystal molecules 13a and 13b in areas A and B that come in contact with the substrates of liquid crystal layer 13 in FIG. 1.

Though the pretilt angle and the thickness of the liquid crystal layer are preferred to be uniform in order to get a uniform display, the larger the pretilt angle for the uniformity, the more difficult it becomes to form, limiting itself to 8 degrees at most. The value of Z depending upon this pretilt angle, is $$7 \leq Z \leq 10$$

in the practicable range of the pretilt angle.

The electrooptical liquid crystal device where such optically anisotropic elements are arranged in combination is suited to the OCB mode and to the normally white display of any mode analogous thereto. By this concept, viewing angle can be widened thus making up for the optical anisotropy of the liquid crystal layer which is a component in such liquid crystal layers. Within this range, excellent display performance with wide viewing angle and limited inversion area can be achieved. When the value of Z becomes less than 7, the inversion area widens narrowing the range of good contrast ratio. Conversely, the inversion area expands again if the value is larger than 10. This invention prefers more specifically such Z value as $$8 \leq Z \leq 10.$$

In this invention, OCB, display mode OCB and any display mode analogous thereto use the optically anisotropic elements under the foregoing conditions in order to get a wider viewing angle. Furthermore, the inventors found the fact that this invention can set the drive voltage within a practical range for brighter display by specifically establishing the relationship between the retardation of optically anisotropic elements and that of the liquid crystal cell.

The OCB and any display mode similar thereto are all birefringent mode, and the transmittance T of their liquid crystal cells can be represented by the following equation:

$$T=\sin^2 (R/\pi\lambda) \qquad (1)$$

The equation (1) being an orthogonal Nicol, the optical axis represents the transmittance at an angle of 45 deg. with the transmittance axis; R is the retardation value of the optical anisotropic body existing between the polarizers; and $\lambda$ the wavelength of the light source.

The optical axis of the optically anisotropic element is perpendicular to the orientation of the rubbing axis of the liquid crystal cell. In such an alignment as above, the value of the total retardation is the respective retardation differences of the liquid crystal cell retardation RLC and the retardation Rfxy of optically anisotropic element. The parameter R in the equation (1) can be expressed as follows:

$$R=RLC-Rfxy \qquad (2)$$

Therefore, from equation (2), the transmittance of the liquid crystal cell can be determined in terms of the difference between the retardation of the liquid crystal cell and that of the optically anisotropic element in its in-plane direction. That is, the in-plane retardation of the optically anisotropic element has an influence on the brightness of the display.

The retardation of the liquid crystal cell varies as a function of the voltage to be applied on the liquid crystal layer. When the voltage of the liquid crystal cell so varies that the retardation of the liquid crystal cell becomes equal to the in-plane retardation of the optically anisotropic element, the total retardation becomes zero to give the black display.

That is, the retardation of the optically anisotropic element in the in-plane direction has an influence on the voltage that gives the black display. The retardation ratio M of the in-plane retardation of the liquid crystal cell to that of the optically anisotropic element is defined as follows:

$$M = RLC/Rfxy = \Delta n_{LC} \times d_{LC}/(n_x d - n_y d) \qquad (3)$$

where $\Delta n_{LC}$ is the refractive index anisotropy of the liquid crystal cell and $d_{LC}$, the thickness of the liquid crystal layer.

Figure 11:
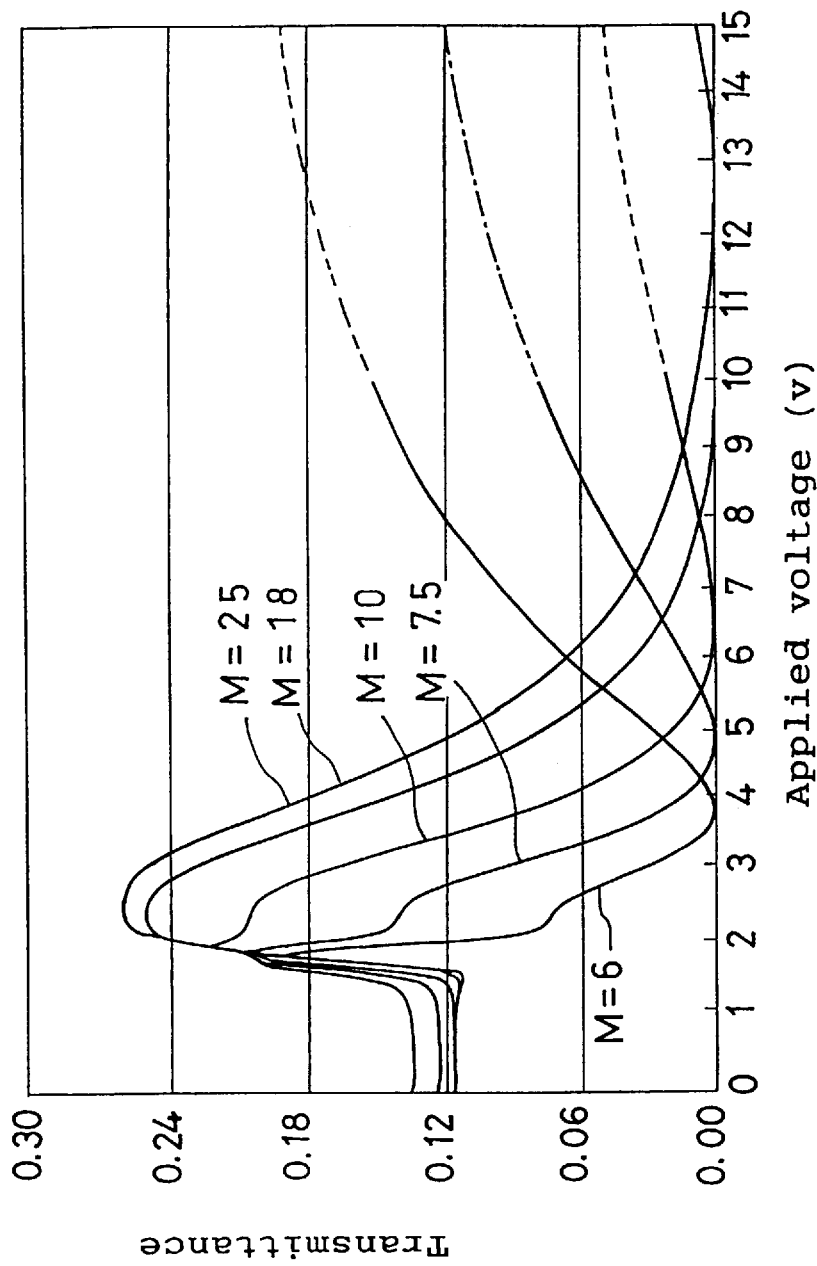
FIG. 11 is a graph for representing the applied voltage versus transmittance curve with the value of retardation M as a parameter.

FIG. 11 depicts the retardation index ratio M dependency on the electrooptical characteristics. When the value of M is not more than 7.5, the transmittance reduces to decrease the contrast ratio and degrade the display quality. If M becomes 18 or higher, the transmittance increases and the display quality improves, but the black display voltage becomes 10 V or higher, which is too high. This is impractical, because high voltage in an integrated circuit increases power consumption. Therefore, the preferred retardation ratio M that achieves good brightness and practicable black display voltage should be:

$$7.5 < M < 18.$$

The electrooptical liquid crystal device by this invention prefers that the optically anisotropic element satisfies $0.022 \leq n_x d - n_y d \leq 0.667$ and $0.15 < n_x d - n_z d < 6.7$. By this we can get an electrooptical liquid crystal device having the optically anisotropic elements when the value of $\Delta n_{LC} \times d_{LC}$ of the liquid crystal layer is not less than 0.3 $\mu$m and not more than 5 $\mu$m.

One of the two polarizers may be a reflector in the electrooptical liquid crystal device of this invention. Because the light passes through the device two times, the lower limit value of $(n_x d - n_y d)$ is 0.011.

The electrooptical liquid crystal device of this invention allows for a display with high speed response because if the first voltage is applied when the display of this device is turned on, the slant of partial liquid crystal molecules 13c1 in the third liquid crystal layer area C at the time of the application of the first voltage comes almost parallel to the normal of the substrates.

The electrooptical liquid crystal device of this invention is such that the display operates during the voltage application between the first voltage and the second voltage and that therefore a high-speed response display can be realized. Further, the slant of the liquid crystal molecules varies stepwise from the liquid crystal molecules disposed almost parallel to the normal of the substrates in the third liquid crystal layer when the first voltage is applied toward the thickness direction of the liquid crystal layer sandwiched between the two substrates. Specifically, the optical liquid crystal element is such that the slant of the liquid crystal molecules at the center of the third liquid crystal layer area in the thickness direction of the liquid crystal layer when the first voltage is applied comes almost parallel to the normal of the substrates. The two polarizers of the electrooptical liquid crystal device are so disposed that their respective optical axes orthogonally intersect with each other. By this design and by setting the value of optical indicatrix coefficient X and retardation ratio M as above, a good black display is achieved at the second voltage application.

Though the display is possible with two polarizers either parallel or orthogonal to each other, it is necessary that the transmittance be low enough to get a good contrast ratio. As such, the orthogonally intersected polarizers are preferred.

The black display with parallel polarizers is influenced by the wavelength dispersion. The parallel polarizers are thought to reduce the contrast ratio, but they likely increase the transmittance.

The optical axes of the polarizers are placed in the direction 45 deg. slanted from the bisector that bisects the angle with respective aligned directions of the two substrates. This setting gives the maximal transmittance when the polarizers are arranged orthogonally or in parallel.

Hereinafter shown is the molecular aligned state of the liquid crystal layer of the material OCB mode and any mode similar thereto that can apply to the foregoing electrooptical liquid crystal device. This can apply also to the case where one of the polarizers is a reflector. Since in this case the light incident on the liquid crystal cell passes through the distance twice, the thickness of the liquid crystal layer can be about half that of the transmission type liquid crystal layer, thereby allowing further improvement of the response speed.

The electrooptical liquid crystal device of this invention has characteristics that the liquid crystal molecules of liquid crystal layer that array themselves from one to another of the two substrates are splay-arranged when no voltage is applied. This means that this device can apply to the OCB mode.

Another aspect of the electrooptical liquid crystal device by this invention has characteristics that the twist ability $\theta_0$ in the in-plane direction is zero in the substrates of the liquid crystal molecules of the liquid crystal layer that run from one to the other of the two substrates.

In this context, the twist ability or twisting capability signifies the spontaneous twist angle of the liquid crystal itself, which can generally be controlled by the mixed concentration of the cholesteric liquid crystal composition.

Another aspect of the electrooptical liquid crystal device of this invention has characteristics that the twisting capability $\theta_0$ of the liquid crystal molecules of liquid crystal layer that array themselves from one to the other of the two substrates is larger than zero in the in-plane direction of the substrates. If the twist ability $\theta_0$ is $\theta_0 > 0°$, the shift time is by far the shorter than the shift time $\theta_0$ from the splay-aligned state with no voltage applied to the state where the slant of part of the liquid crystal molecules of the third liquid crystal layer area with the first voltage applied is almost parallel to the normal of the substrates is zero ($\theta_0 = 0°$).

Yet another aspect of the electrooptical liquid crystal device by this invention has characteristics that the twist ability $\theta_0$ is 90° of the liquid crystal layer that arrange themselves from one to the other of the two substrates in the in-plane direction of the substrates and that the pretilt angle of one substrate differs from that of other substrate. The display is enabled by the difference of pretilt angle in one substrate from that in another one when $\theta_0$ is 90°.

Still another aspect of the electrooptical liquid crystal device by this invention has characteristics that the twist ability is 180 deg. of the liquid crystal molecules of liquid crystal layer that array themselves from one toward another of the two substrates in the in-plane direction of the substrates. Most preferably the twist ability should be 180 deg. as well as on the order of 175 to 185 deg. if one takes the backflow effect into due consideration. Backflow effect occurs when raised liquid crystal molecules existing in the vicinity of the central portion with some voltage applied attempt to return the liquid crystal molecules lying down in the vicinity of the substrates if the voltage is cut off but, the liquid crystal molecules completely raised in the neighborhood of the center are prevented from lying down by the liquid crystal molecules in the vicinity of the center slowing their speed of returning into the lying down state. Though this backflow effect disappears in the case of bend array, it occurs if any twisted state except 180 deg. twisted liquid crystal is given rise to.

Furthermore, the electrooptical liquid crystal device by this invention has characteristics that when no voltage is applied onto the electrodes the plural liquid crystal molecules in the third liquid crystal layer area are substantially parallel to each other and array themselves twisted in the in-plane direction of the substrates from one toward another of these substrates. This is the case of a mode similar to the OCB mode, where this invention is also applicable and the high speed response is possible in the display area as is the case with the OCB mode itself.

The electrooptical liquid crystal device according to this invention in a mode analogous to the OCB mode has characteristics that the twist angle of the liquid crystal molecules of liquid crystal layer that arrange themselves from one toward another of the two substrates is substantially 90 deg. or substantially 270 deg. in the in-plane direction of the substrates and that the pretilt angle of the liquid crystal layer in one substrate differs from that of another substrate. If, in this case, the twisting angle is 90 deg. or 270 deg., the phase difference size of liquid crystal layer is equal in the upper and lower halves of the liquid crystal layer and their directions are by 90 deg. different from the other in the area where the liquid crystal molecules near the center of liquid crystal layer are raised up. Thus the upper half and lower half of the cell compensate each other for the phase difference of the cell as a whole. This results in that any further addition of applied voltage to drive the liquid crystal molecules cannot change the optical response. If, conversely, the pretilt angle of one substrate is made to be different from that of the other substrate, the phase difference is produced in the upper and lower halves of the cell due to the different arrays therein. Thus, a bright display can be achieved even when a saturated voltage is applied where the pretilt angle in one substrate is different from that of another substrate. Further application of voltage will give a dark display enabling thereby a high-speed display. The differentiation of the pretilt angle of one substrate from that of another substrate is effective in the case of 90 deg. or 270 deg. of twist angle where the phase difference of the cell as a whole is compensated by the upper and lower halves of the cell and in the case of 85 deg. to 95 deg. (except 90 deg of twist angle ) and 265 deg. to 275 deg. (except 270 deg. of tilt angle for the same reason) that are likely to be in such a compensating relationship.

Still another aspect of the electrooptical liquid crystal device according to this invention has characteristics that no voltage is applied onto the liquid crystal layer at the time of the first voltage application. This is the case of a mode analogous to the OCB mode, where the slant of partial liquid crystal molecules in the third liquid crystal layer area runs substantially parallel to the normal line to the substrates when no voltage is applied and where this invention is applicable.

The optically anisotropic element has characteristics that it comprises at least one phase plate containing two optical axes.

An aspect of the optically anisotropic element where one phase plate alone cannot realize the range of Z according to this invention has characteristics that it comprises the combination of two or more phase plates each having one optical axis and that the optical axes of at least two phase plates are not identical.

In the case where the range of Z value cannot be realized by combination of one-axial optically anisotropic elements, one aspect of the optically anisotropic element has characteristics that it comprises at least one phase plate having one optical axis and at least one phase plate having two optical axes.

Another aspect of the optically anisotropic element has characteristics that it comprises at least one phase plate whose optical anisotropy is negative in the direction of the normal to the substrates when the substrates and the optically anisotropic element are disposed substantially parallel to each other.

In the case where the optical effect of the twist in liquid crystal cell is to be better compensated, another aspect of the optically anisotropic element has characteristics that the optical axes of the optically anisotropic elements are twisted in the normal to the substrates or in the in-plane direction of the substrates or else in both of these directions.

Such optically anisotropic elements as above compensate the twist of the liquid crystal layer or the optical anisotropy of the normal direction components of substrates in the liquid crystal layer.

As has thus far been described, the optically anisotropic element according to this invention only has two optical axes by single or combined use of the phase plate or plates having one or two optical axes and negative phase plate or plates. In an exemplary case where two or more phase plates each having one optical axis are used in combination, two or more phase plates should be arranged so that their optical axes should not coincide and that the optically anisotropic element can have two optical axes.

Moreover, the optical influence by the twist of liquid crystal layer may be compensated by endowing the optical axes of optically anisotropic elements with twists in such a fashion that the twisted axes can compensate the twists of the liquid crystal molecules in the liquid crystal layer in the in-plane direction of the substrates or those in the normal to the substrates or in both of these directions. This case includes a state where the liquid crystal molecules in the liquid crystal layer are twisted either entirely or partially, and either continuously or stepwise in the in-plane direction of the substrates or in the normal direction thereto or else in both of these directions.

The optical anisotropy of the normal direction components of the substrates in the liquid crystal layer can be compensated by endowing the optical axes of optically anisotropic elements with twists in such a way that these elements should be optically equivalent to the phase plates which are negative to the normal direction components of the substrates in the liquid crystal layer. This compensation can be realized by such an optical axis of optically anisotropic element that is heavily twisted into the in-plane direction of the substrates.

The materials used preferably for the phase plate are polycarbonate, polyarylate or, to give a twist to the optical axis of the material as optically anisotropic element, cholesteric liquid crystal polymer, discotic liquid crystal polymer, etc. The present invention is however not limited to these materials if only the characteristics as mentioned above can be obtained.

Referring now to several embodiments, there is explained more in detail the electrooptical liquid crystal device by this invention taking first a case where the twist angle of the liquid crystal molecules of liquid crystal layer that align themselves from one toward another of two substrates is 180 deg.

EMBODIMENT 1

Figure 3:
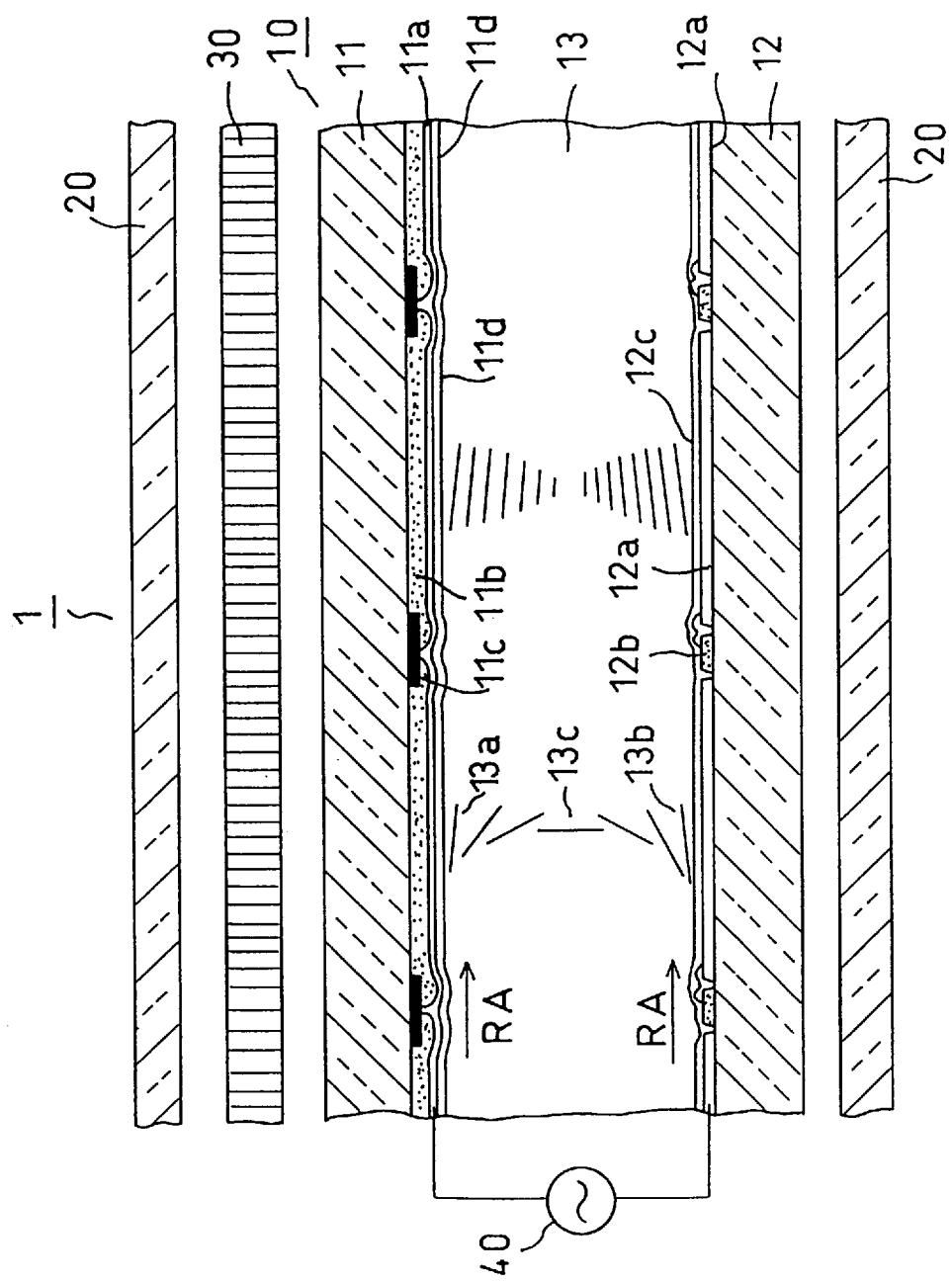
FIG. 3 is a cross sectional view of an embodiment of the electrooptical liquid crystal device by this invention.

As shown in FIG. 3 and FIG. 4, the electrooptical liquid crystal device 1 of TFT-LCD comprises a liquid crystal cell 10, two polarizers 20 that sandwich this liquid crystal cell 10, an optically anisotropic element 30 sandwiched between the liquid crystal cell and one of the polarizers, and a voltage drive source 40.

The liquid crystal cell 10 disposes the first substrate 11 where an electrode 11a is formed on its main plane and the second substrate 12 where an electrode 12a is formed on its main plane so that these electrodes face opposite to each other to sandwich the liquid crystal layer 13 between the two substrates 11 and 12. This device is an electrooptical liquid crystal device with normally white display. The optically anisotropic element 30 compensates the optical anisotropy of the liquid crystal layer 13.

As shown in FIG. 1a, the liquid crystal layer 13 containing plural liquid crystal molecules comprises the first liquid crystal layer area A having plural liquid crystal molecules 13a in contact with one of the two substrates 11, the second liquid crystal layer area B having plural liquid crystal molecules 13b in contact with the other of the two substrates 12, and the third liquid crystal layer area C having plural liquid crystal molecules 13c sandwiched between the first liquid crystal area and the second liquid crystal layer area. FIG. 1 a depicts the alignment of liquid crystal molecules when no voltage is applied onto the electrodes, FIG. 1b illustrates the alignment where the first voltage is applied onto the electrodes and FIG. 1c shows the alignment where the second voltage is applied.

When no voltage is applied from the voltage drive source 40 onto the electrodes 11a and 12a as shown in FIG. 1a, the liquid crystal molecules 13c in the third liquid crystal layer area C are substantially parallel to each other and align themselves twisted in the in-plane direction of the substrates.

When the first voltage is applied to the electrodes, the slant of the partial liquid crystal molecules 13c1 in the plural liquid crystal molecules in the third liquid crystal layer area C runs almost parallel to the normal of the substrates, as shown in FIG. 1(b). This first voltage application signifies the sharp change of phase difference, by applied voltage, of the liquid crystal cell wherein the liquid crystal molecules run substantially parallel to the normal direction of the substrates at threshold or higher voltage, namely when the liquid crystal molecules begin to rise up, into further larger application voltage onto the liquid crystals.

As shown in FIG. 1c, when the second voltage is applied to the electrodes, the slant of the plural liquid crystal molecules 13c1, 13c2 and 13c3 in the third liquid crystal layer area runs almost parallel to the normal to the substrates. When this second voltage, which is still higher than the first voltage, is applied, the liquid crystal molecules 13c in the third liquid crystal layer area come substantially parallel to the normal to the substrates, namely, the liquid crystals have risen up.

FIG. 3 schematically illustrates the liquid crystal cell 10 that sandwiches this liquid crystal layer 13 between two substrates. As shown in FIG. 3, the liquid crystal cell 10 disposes the array substrate 12 wherein the electrodes 12a are formed on one plane of a glass substrate, and the opposed substrate 11, wherein the electrode 11a is formed on one plane of the glass substrate, so that these two main planes oppose each other and a nematic liquid crystal layer 13 is sandwiched between the two substrates.

Provided in matrix form in the array substrate 12 are plural signal lines (not shown) and scanning lines (not shown) on the glass substrate, and the polysilicon TFT 12b and the picture element electrode 12a as connected to this TFT are formed on the intersection point of the signal and scanning lines, on which an aligning layer 12c has been formed. On the other hand, provided on the glass substrate of the opposed substrate 11 are a color filter 11b containing three primaries of red, green and blue in respective correspondence to each pixel electrode 12a of the array substrate 11, and the black matrix 11c so formed that it delineates the color filter for each color, on which the ITO electrode 11a and the aligning layer 11d are formed in a sequential order.

With particular reference to the manufacturing and display methods according to this invention, provided on the glass substrate was an array substrate 12 of vertically 480×horizontally 640×3 pixels with polysilicon TFT 12b, the gate lines that are scanning lines (not shown), signal lines (not shown) and picture element electrode 12a.

Next provided on the glass substrate were the color filter 11b containing three primaries of red, green and blue in response to the respective pixel electrodes on the array substrate 12, and the black matrix 11c so formed that it delineates the color filter, on which ITO electrode 1 1a was formed as opposed substrate 11. Applied on these array substrate 12 and opposed substrate 11 was polyimide (GE-5211, by Nissan Chemical Industries, pretilt angle: about 5 deg.), 80 mm in thickness, as material of aligning layers 12c and 11d, wherein the pixel pitch was 0.33 mm vertically and 0.11 mm horizontally. Then, the aligning layer was rubbed so that the rubbing directions RA of two substrates ran parallel to each other when the respective electrodes 11a and 12a on the two substrates 11 and 12 were oppositely disposed.

Dispersed on the array substrate 12 as a spacer (not shown) were globular particulates (Mcropearl SP. of Sekisui Fine Chemical make) on the main plane of one of the substrates at the density of 80 pcs per square millimeter. Screen printing process applied an epoxy resin adhesive agent (XN-21, by Mitsui Toatsu Chemicals) on the peripheral portion of effective display area of the other opposed substrate 11 except for the opening for injection. The array substrate 12 and the opposed substrate 11 were superimposed, so that the aligning layers face opposite to each other, and adhered under pressure and heat into the liquid crystal cell 10, 7.1 µm in cell gap.

Then vacuum injection injected nematic liquid crystal composition (ZLI-1132, of E. Merck make, Δn=0.14) plus chiral agent (S811, by E. Merck) as liquid crystal composition into the liquid crystal cell. After the injection, the injection port of the liquid crystal was sealed with ultraviolet curing resin (UV-1000, by Sony Chemical). The concentration of the chiral agent was regulated so that the helical pitch of the liquid crystal would be about 35 µm. Disposed on the side of the opposed substrate 11, where the color filter 11b of this liquid crystal cell has been formed, was the phase plate as optically anisotropic element 30 of polycarbonate make so that the side of the phase plate with larger refractive index intersects orthogonally the ribbing direction.

The elliptical coefficient Z of the optically anisotropic element 30 was so adjusted that Z=9 when $Z=(n_x d - n_z d)/(n_x d - n_y d)$, where $n_x d$, $n_y d$ and $n_z d$ represent refractive index components in x, y and z directions respectively of the total sum of the product of the refractive index of the optically anisotropic elements and the thickness (unit: µm) of the optically anisotropic elements in the direction of the normal to the substrates when the substrates and the optically anisotropic elements are arranged parallel to each other. The $n_x d$ and $n_y d$, which are perpendicular to each other, represent the refractive index components of the optically anisotropic elements in the in-plane direction x-y of the plane substantially perpendicular to the thickness direction z of the optically anisotropic elements. The symbol $n_x d$ represents the refractive index components of the optically anisotropic elements in the thickness direction thereof.

The optical axis of the polarizer 20 (G1220DU, by Nitto Denko) should make a 45 deg. angle against the rubbing direction and the two optical axes of the two polarizers orthogonally intersect each other. The phase plate used was the plate whose phase in the in-plane direction is 100 nm (difference between $n_x d$ and $n_y d$ being 0.1) with two axes (film oriented in x-axis direction, and then in y-axis). The phase plate was so disposed that the phase difference of the liquid crystal cell when the second voltage is applied may be compensated, that is, that the optical axes of two polarizers intersect orthogonally with each other and the side of the phase plate with greater refractive index orthogonally intersects the rubbing direction. The optically anisotropic element was adopted in such a way that M=10 from the equation $M = \Delta n_{LC} \times d_{LC}/(n_x d - n_y d)$ supposing M the retardation ratio.

Where $d_{LC}$ (unit: $\mu$m) is the thickness of the liquid crystal layer and $\Delta n_{LC}$ is the refractive index anisotropy of the liquid crystal layer.

In the electrooptical liquid crystal device thus obtained, the plural liquid crystal molecules of the third liquid crystal layer area C go almost parallel to each other and array themselves by 180 deg. twisted in the in-plane direction of the substrate from one toward the other of the two substrates when no voltage is applied onto the electrodes.

When the first voltage is applied, the slant of the liquid crystal molecule 13c1 at the center of the third liquid crystal layer area C among the plural liquid crystal molecules in the third liquid crystal layer area C goes almost parallel to the normal to the substrates and varies stepwise toward the two substrates 11 and 12, as the liquid crystal molecules 13c2 and 13c3, in the thickness direction of the liquid crystal layer 13 sandwiched between the two substrates around the liquid crystal molecule 13c1.

When the second voltage is applied, the slant of the plural liquid crystal molecules 13c of the third liquid crystal layer area goes substantially parallel to the normal to the substrates.

The voltage drive source 40 was used to drive on/off for displaying for the time interval between the first voltage application and second one. In the case of the present embodiment, used as the minimal value of the drive voltage was such a voltage at which the effective phase difference of the cell should approximately be 0.26 $\mu$m. The display operates at 2.4 V as the first voltage and 6.5 V as the second one.

Figure 7:
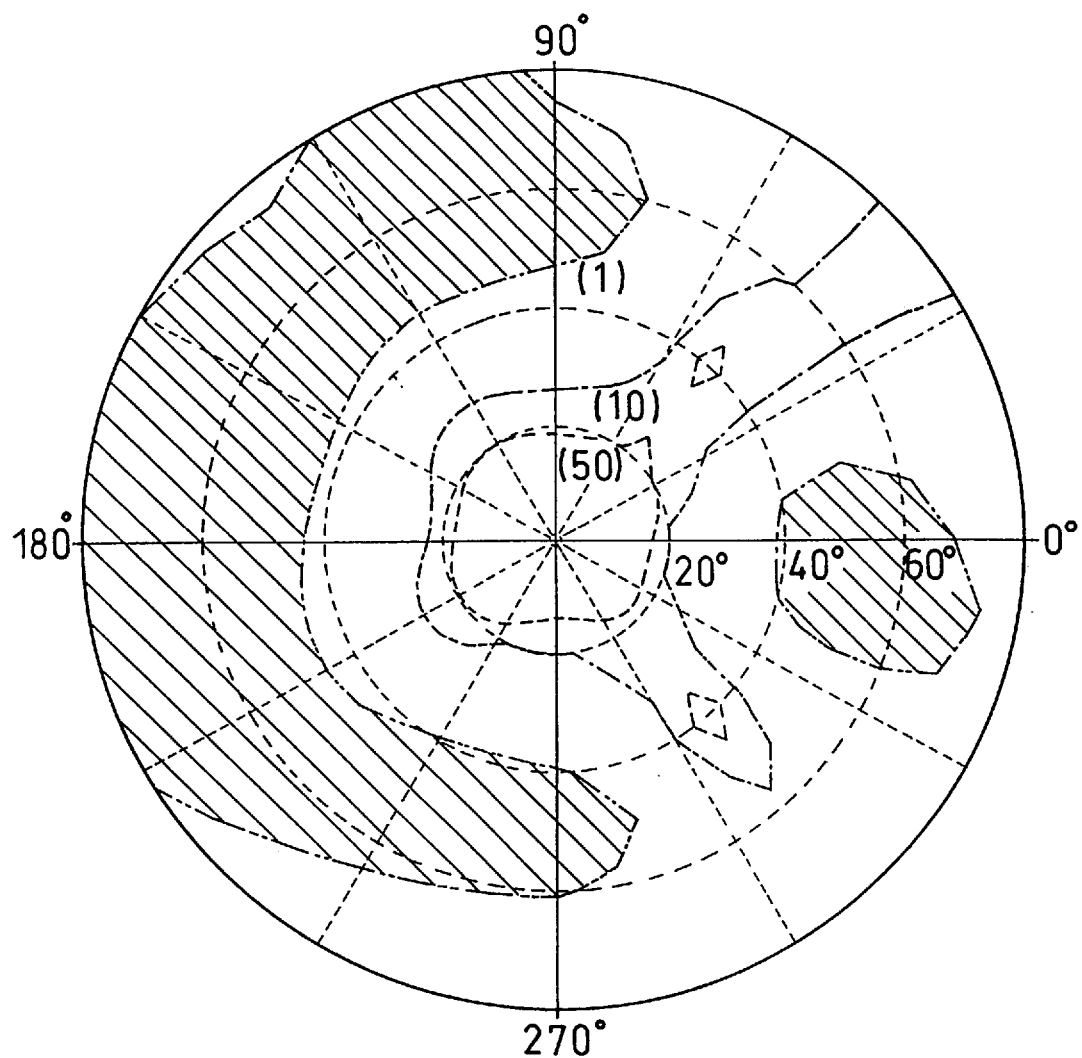
FIG. 7 is a diagram showing the viewing angle characteristic of the electrooptical liquid crystal device according to comparison example 1.
Figure 8:
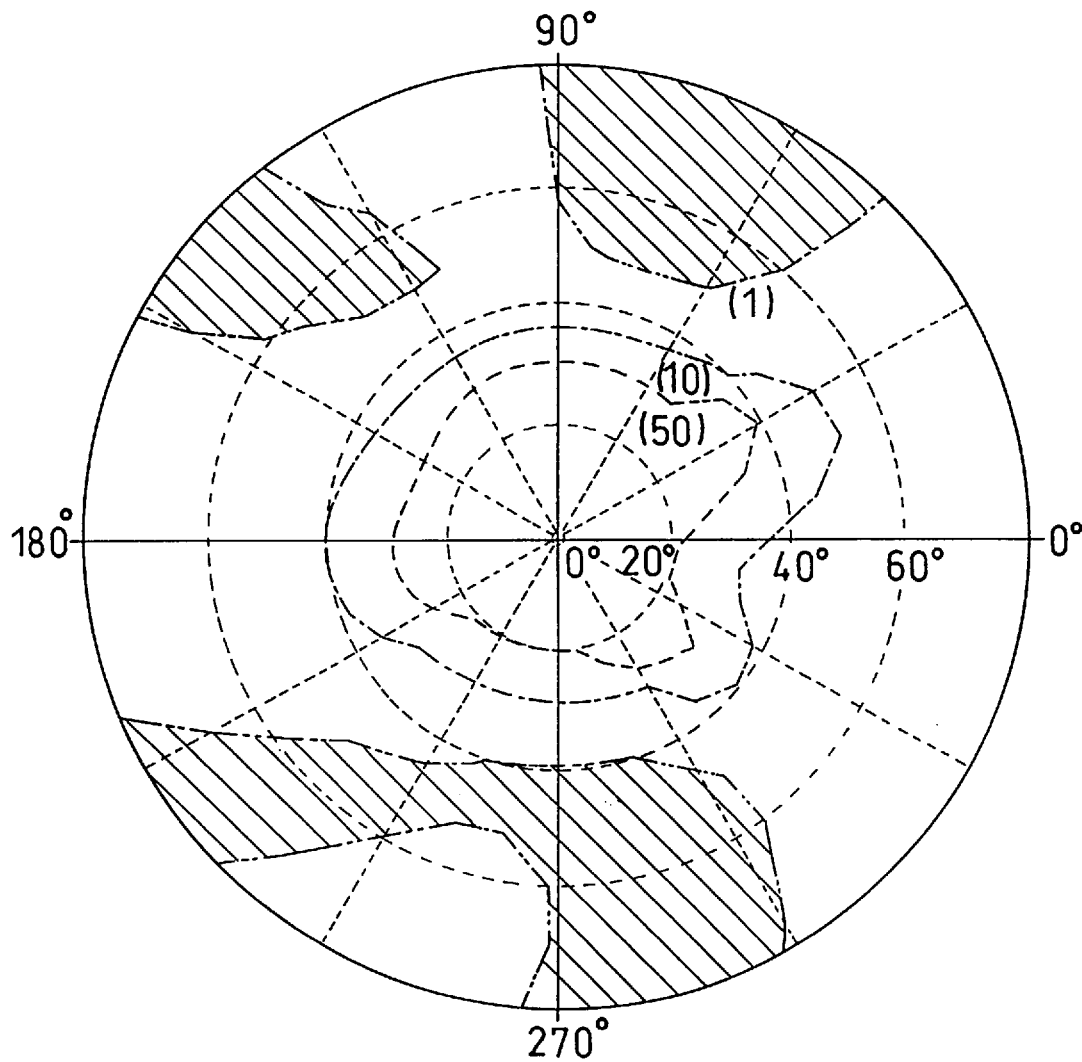
FIG. 8 is a diagram showing the viewing angle characteristic of the electrooptical liquid crystal device according to a second embodiment of this invention.
Figure 9:
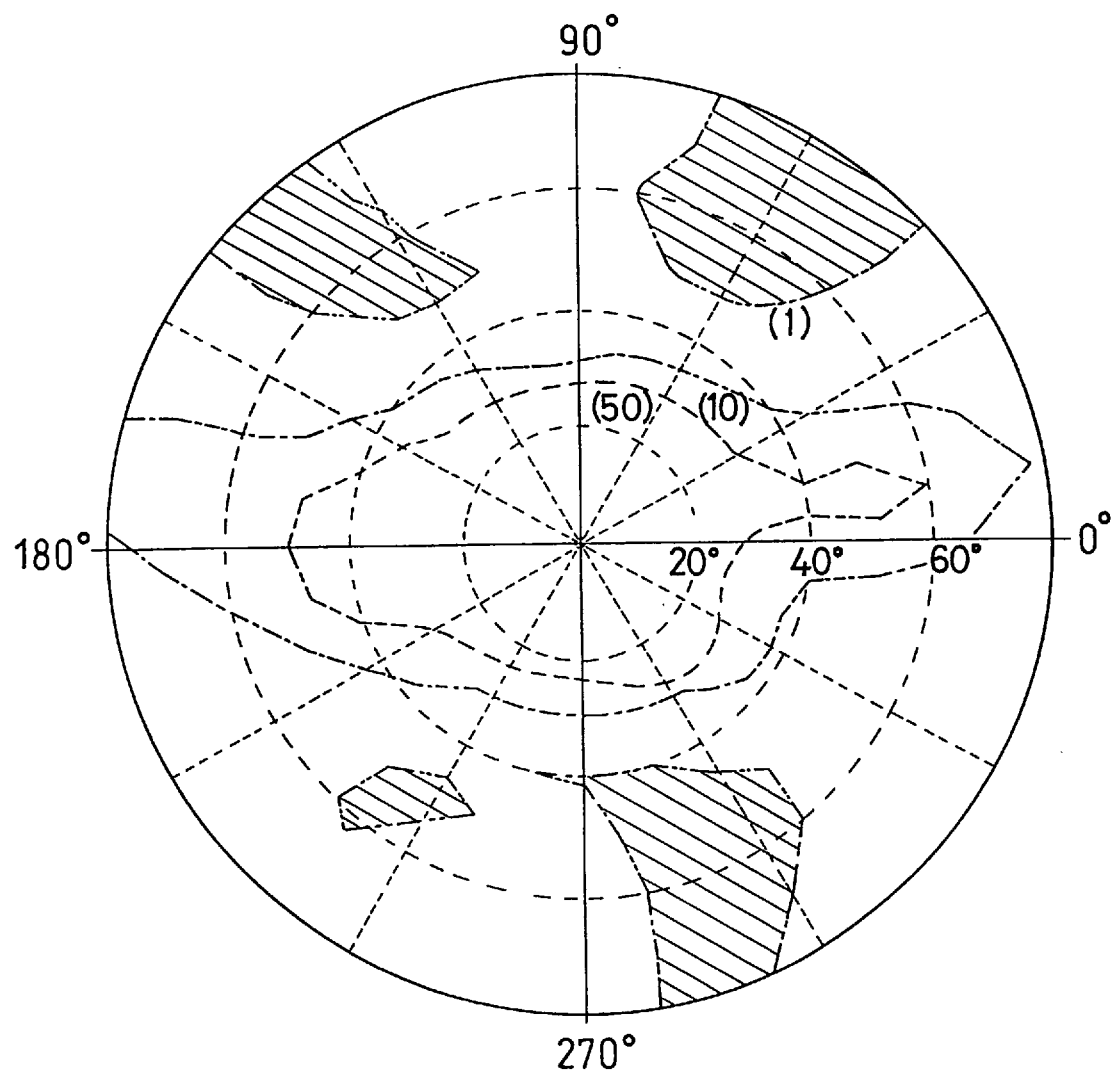
FIG. 9 is a diagram showing the viewing angle characteristic of the electrooptical liquid crystal device according to a first embodiment of this invention.

FIG. 9 illustrates that as a result such electrooptical characteristics are obtained as the transmittance reduces monotonously against the drive voltage with 100 or higher contrast ratio on the front and wide viewing angle. The response speed was about 5 ms, almost uniform (no difference) between the gradations with the contour not blurred even when displaying moving images. FIG. 7 to FIG. 10 are the diagrams that show the Iso-contrasts. They represent the contrasts that depend on the observation direction with the normal to the substrates from the center of the circle as the referential observation direction. The hatched portions depict the inverse areas. In FIG. 7 to 10, as the circle grows larger in concentric form from the center to the outside, the angle between the normal and observation direction of the substrates increases. The direction of the line connecting the center of circle with any given point on this circle (azimuth) represents the observation direction.

In the figures, the curve (50) gives a contrast ratio, the area delineated by this curve gives the contrast ratio not less than 50, and the area delineated by the curve 10, 50 to 10 contrast ratios, and finally the area surrounded by curve (1), 1 to 10 contrast ratio.

EMBODIMENT 2

TFT-LCD was manufactured using the same material and under the same conditions as in Embodiment 1, but with a Z value of 7 for the phase plate. FIG. 8 shows the results. The LCD thus obtained showed good results despite swayed viewing angle.

COMPARISON EXAMPLE 1

TFT-LCD was manufactured using the same material and under the same conditions as in Embodiment 1, but with a Z value of 1 for the phase plate (one uniaxial phase plate used). FIG. 7 shows the results. The LCD thus obtained revealed a very wide inversion area and significant reduction of contrast.

COMPARISON EXAMPLE 2

Figure 10:
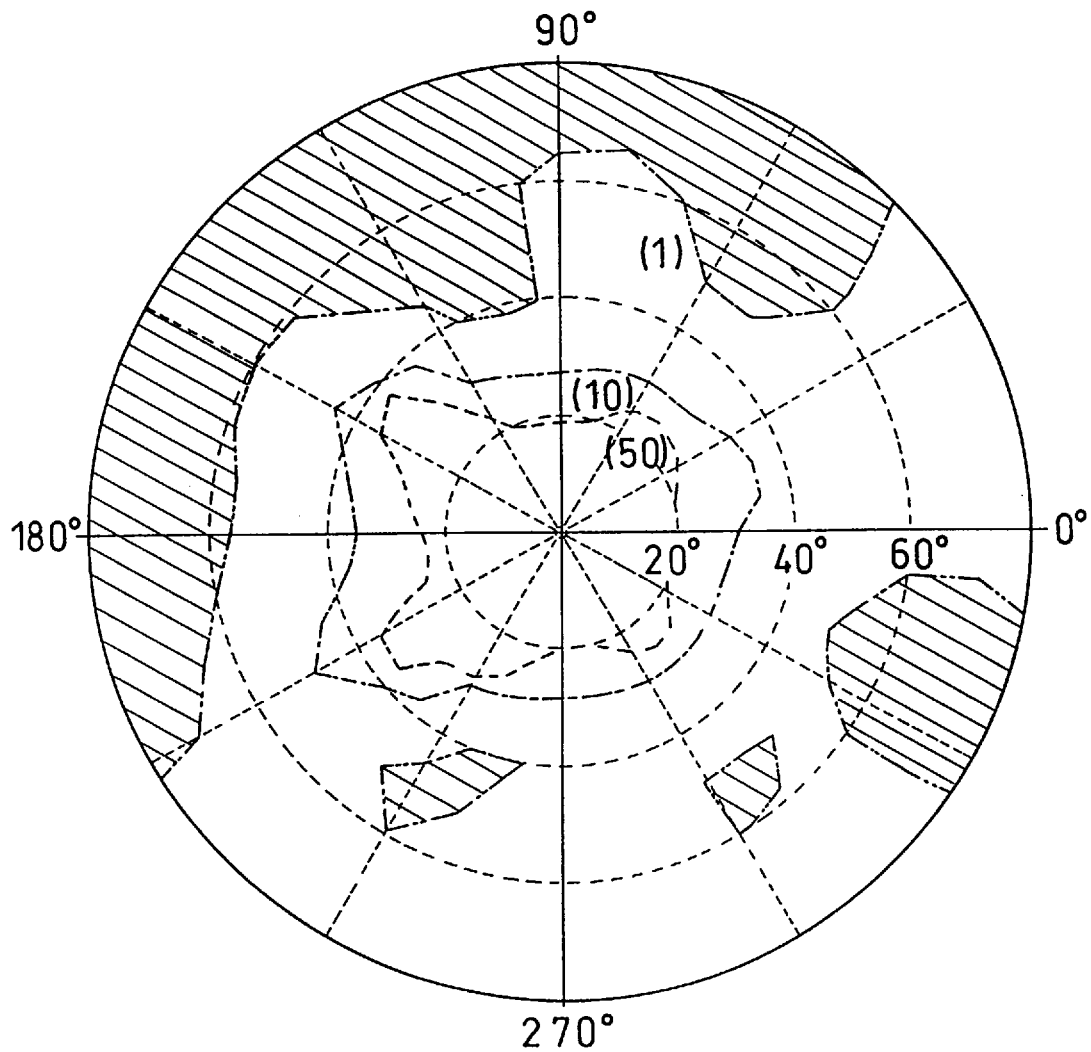
FIG. 10 is a diagram showing the viewing angle characteristic of the electrooptical liquid crystal device according to comparison example 2.

TFT-LCD was manufactured using the same material and under the same conditions as in Embodiment 1, but with a Z value of 12 for the phase plate (one uniaxial phase plate used). FIG. 10 shows the results. The LCD thus obtained revealed a very wide inversion area and significant reduction of contrast.

As stated above, an optical liquid crystal element with little viewing angle dependency is given by using such an optically anisotropic element that satisfies $7 \leq Z \leq 10$, and more preferably $8 \leq Z \leq 10$.

This case may be applied with similar effects to the OCB mode with normally white display and other modes analogous thereto.

FIG. 11 shows the relationship between the applied voltage (abscissa) and transmittance (ordinate) when the value of M is varied supposing 1.0 the $\Delta n_{LC} \times d_{LC}$.

EMBODIMENT 3

TFT-LCD was manufactured using the same material and under the same conditions as in Embodiment 1, except that such optically anisotropic element in Embodiment 1 as satisfies Z=9, M=10 by superimposing a uniaxial phase plate whose phase difference is 400 nm in the in-plane direction of the plate with another uniaxial phase plate whose phase difference is 500 nm in the in-plane direction of the plate. The LCD thus obtained exhibited improved viewing angle characteristics.

EMBODIMENT 4

TFT-LCD was manufactured using the same material and under the same conditions as in Embodiment 1, except that such optically anisotropic element in Embodiment 1 as satisfies Z=9, by superimposing a uniaxial phase plate whose phase difference is 100 nm in the in-plane direction of the plate with a negative phase plate ($n_x d > n_y d > n_z d$). The LCD thus obtained exhibited improved viewing angle characteristics.

COMPARISON EXAMPLE 3

TFT-LCD with M=7.4 was manufactured using same material and under the same conditions as in Embodiment 1, except that the optically anisotropic element in Embodiment 1 as satisfies Z=9 was used with 5.3 μm the spacer diameter in Embodiment 1 and 5.3 μm the cell gap. The LCD thus obtained was low in transmittance showing the display quality likelier to be deteriorated.

COMPARISON EXAMPLE 4

TFT-LCD with M=18.2 was manufactured using same material and under the same conditions as in Embodiment 1, except for 13 μm, the spacer diameter in Embodiment 1 and 13 μm the cell gap. The LCD thus obtained limited its maximum applied voltage to 6 V only, because any higher voltage thereto may destroy the TFT element. Black color was not sufficiently black and display quality was degraded.

Thus, the optically anisotropic element according to this invention can be achieved by using one phase plate having two optical axes, two or more phase plates having one optical axis respectively, or a phase plate having two axes or one axis with negative phase plate. An optically anisotropic element with good display quality preferably has the M value ranging to 7.5<M<18.

EMBODIMENT 5

TFT-LCD with Z=9 and M=10 was manufactured using same material and under the same conditions as in Embodiment 1, except that one of the polarizers was replaced by a reflector, the spacer diameter was 3.6 μm, the cell gap was 3.6 μm, and the phase difference was 50 nm in the in-plane direction of the phase plate. Driving the LCD thus obtained revealed good viewing angle and bright display.

EMBODIMENT 6

The optically anisotropic element as in Embodiment 1 was manufactured by combining two twisted phase plates. More specifically, combined were one phase plate with 10 deg. of twist angle of optical axis in the in-plane direction of the substrates made from cholesteric liquid crystal polymer and 100 nm of phase difference in the in- plane direction, on the one hand, and one phase plate with 650 deg. of twist angle of optical axis in the in-plane direction of the substrates and 0 (zero) phase difference in the in-plane direction, on the other. The optical axis of this optically anisotropic element as a whole has been twisted by 660 deg. in the inplane direction of the substrates.

The optical axis of optically anisotropic element thus twisted allowed for high contrast and use of a phase plate with 650 deg. twist angle of its optical axis exhibited same effect of the optically negative phase plate with better viewing angle characteristic.

EMBODIMENT 7

The optically anisotropic element as in Embodiment 1 was manufactured by combining one twisted phase plate and one negative phase plate. More specifically, combined were one phase plate with 10 deg. of twist angle of optical axis in the in-plane direction of the substrates made from cholesteric liquid crystal polymer, on the one hand, and one phase plate whose optical anisotropy is negative in the direction of the normal to the substrate when the substrate and an optically anisotropic element are disposed almost parallel to each other, on the other, in such a fashion that the Z of the optically anisotropic element as a whole should be 9.

The optical axis of optically anisotropic element thus twisted allowed for high contrast and use of an optically negative phase plate exhibited good viewing angle characteristic.

EMBODIMENT 8

The optically anisotropic element as in Embodiment 1 was manufactured by combining one twisted phase plate and one phase plate having two axes and no twist. More specifically, combined were one twisted phase plate made from cholesteric liquid crystal polymer, on the one hand, and one phase plate having two axes, on the other, in such a fashion that the Z of the optically anisotropic element as a whole should be 9.

Such electrooptical liquid crystal device as has thus far been described in the above embodiments has a wide variety of use in the liquid crystal display elements for personal computers and word processors, light valves for video projector and high-speed liquid crystal shutters for three-dimensional television, to enumerate a few embodiments.

Because the electrooptical liquid crystal device by this invention has biaxial and optically negative anisotropic elements to be combined with the OCB mode or any mode similar thereto and has been set to the elliptical coefficient Z not less than 7 and mot more than 10, it allows for an excellent viewing angle characteristics as suited to the normally white display in the mode.

What is claimed is:

1. An electrooptical liquid crystal device comprising:

a bend-aligned liquid crystal cell including two substrates and a liquid crystal layer therebetween with molecular twisted alignment at the center of the cell, at least one optically anisotropic element arranged to reduce a viewing angle dependency of the bend-aligned liquid crystal cell, and at least one polarizer disposed substantially parallel to the bend-aligned liquid crystal cell, to operate as a normally white display mode, wherein the optically anisotropic element has an elliptic coefficient Z that $7 \leq Z \leq 10$, if $Z=(n_xd-n_zd)/n_xd-n_yd$, where $n_xd$, $n_yd$ and $n_zd$ represent the refractive index components in x, y and z directions respectively of the products of the refractive indice of the optically anisotropic element and the thickness (unit: μm) of the optically anisotropic element in a direction of a normal to the substrates when the substrates and the optically anisotropic element are arranged parallel to each other, the symbols $n_xd$ and $n_yd$, which are perpendicular to each other, representing the refractive index components of the optically anisotropic element in a in-plane direction x-y of a plane substantially perpendicular to a thickness direction z of the optically anisotropic element, and the symbol $n_zd$ representing the refractive index components of the optically anisotropic element in the thickness direction z thereof.

2. An electrooptical liquid crystal device of normally white display made comprising:

a liquid crystal cell wherein two substrates having electrodes for applying voltage at respective main planes are disposed so that the main planes should be opposed to each other and a liquid crystal layer sandwiched between these substrates, two polarizers disposed as sandwiching the liquid crystal cell, an optically anisotropic element disposed between one of the polarizers and the liquid crystal cell, and driving means for applying said voltage to the liquid crystal cell connected to the electrodes, wherein the liquid crystal layer has a first liquid crystal layer area containing plural liquid crystal molecules in contact with one of the two substrates, a second liquid crystal layer area of the liquid crystal layer containing plural liquid crystal molecules is in contact with the other of the two substrates, and a third liquid crystal layer area of the liquid crystal layer containing plural liquid crystal molecules is sandwiched between the first liquid crystal layer area and the second liquid crystal layer area, a slant of the plural liquid crystal molecules in the third liquid crystal layer area is substantially parallel to a normal to the substrates when the first voltage is applied, the slant of the plural liquid crystal molecules in the third liquid crystal layer area is also substantially parallel to the normal to the substrates when the second voltage is applied, wherein the optically anisotropic element has an elliptic coefficient Z that $7 \leq Z \leq 10$ if $Z=(n_xd-n_zd)/(n_xd-n_yd)$, where $n_xd$, $n_yd$ and $n_zd$ represent respective products of the refractive index components in x, y and z directions and a thickness (unit: $\mu$m) of the optically anisotropic element in a direction of the normal to the substrates when the substrates and the optically anisotropic element are arranged parallel to each other, the $n_xd$ and $n_yd$ which are perpendicular to each other, representing the refractive index components of the optically anisotropic element in an in-plane direction x-y of a plane substantially perpendicular to a thickness direction z of the optically anisotropic element, and the $n_zd$ representing the refractive index components of the optically anisotropic element in the thickness direction z thereof.

3. The electrooptical liquid crystal device as claimed in claim 1 or 2, wherein the optically anisotropic element has the elliptic coefficient Z that satisfies $8 \leq Z \leq 10$.

4. The electrooptical liquid crystal device as claimed in claim 2, wherein the first voltage is applied when a display of the electrooptical liquid crystal device is to be turned on.

5. The electrooptical liquid crystal device as claimed in claim 2, wherein a display of the electrooptical liquid crystal device is performed in time between the first and second voltage applications.

6. The electrooptical liquid crystal device as claimed in claim 2, wherein a slant of the liquid crystal molecules of the liquid crystal layer, including the liquid crystal molecules as aligned substantially normal to the substrates in the third liquid crystal layer area when the first voltage is applied, varies stepwise respectively toward the two substrates in a direction of the thickness of the liquid crystal layer sandwiched between the two substrates.

7. The electrooptical liquid crystal device as claimed in claim 2, wherein the slant of the liquid crystal molecules at the center of the third liquid crystal layer area becomes substantially parallel to the normal to the substrates in the direction of the liquid crystal layer when the first voltage is applied.

8. The electrooptical liquid crystal device as claimed in claim 1 or 2, wherein a retardation ratio M satisfies 7.5<M<18 when M, the retardation ratio of the liquid crystal cell to that of the optically anisotropic element in its in-plane direction x-y is expressed by $M=\Delta n_{LC} \times d_{LC}/(n_xd-n_yd)$ where $d_{LC}$ is, a thickness (unit: $\mu$m) of the liquid crystal layer, and $\Delta n_{LC}$ the refractive index anisotropy of the liquid crystal layer.

9. The electrooptical liquid crystal device as claimed in claim 2, wherein a one of the two polarizers is a reflector.

10. The electrooptical liquid crystal device as claimed in claim 2, wherein the two polarizers are so disposed that their optical axes intersect orthogonally to each other.

11. The electrooptical liquid crystal device as claimed in claim 2, wherein the optical axes of the polarizers is set in a direction slanted 45 deg. from a bisector of an angle formed between the respective molecular aligned directions of the two substrates.

12. The electrooptical liquid crystal device as claimed in claim 2, wherein when no voltage is applied to the electrodes the plural liquid crystal molecules in the third liquid crystal layer area are substantially parallel to each other and by 3 deg. to 8 deg. slanted against the reverse face of the electrodes and that the liquid crystal molecules align themselves twisted at 180 deg. of twist angle from one toward the other of the two substrates in the in-plane direction of the substrates and that the twist ability of the liquid crystal is within 175 deg. to 185 deg.

13. The electrooptical liquid crystal device as claimed in claim 12, wherein the optically anisotropic element is made from polycarbonate, polyarylate, cholesteric liquid crystal polymer, or discotic liquid crystal polymer.

14. The electrooptical liquid crystal device as claimed in claim 2, claim 8 or claim 12, wherein the optically anisotropic element comprises a combination of two or more phase plates, each having one optical axis in the in-plane direction of the substrates that is different from one another.

15. The electrooptical liquid crystal device as claimed in claim 2, claim 8 or claim 12, wherein the optically anisotropic element comprises at least one phase plate having one optical axis and at lease one phase plate having two optical axes in the in-plane direction of the substrate.

16. The electrooptical liquid crystal device as claimed in claim 2, claim 8 or claim 12, wherein the optically anisotropic element is at least one phase plate that is negative in optical anisotropy in the direction of the normal to the substrates when the substrates and the optically anisotropic element are disposed substantially parallel to each other.

17. The electrooptical liquid crystal device as claimed in claim 2, claim 8 or claim 12, wherein the optical axis of the optically anisotropic element is twisted into the normal to the substrates.

18. The electrooptical liquid crystal device as claimed in claim 17, wherein the optical axis of the optically anisotropic element is twisted both into the in-plane direction of the substrates and in the direction normal to the substrates.

19. The electrooptical liquid crystal device as claimed in claim 2, claim 8 or claim 12, wherein the twist of the optical axis of the optically anisotropic element compensates the twist of the liquid crystal layer.

20. The electrooptical liquid crystal device as claimed in claim 2, claim 8 or claim 12, wherein the twist of the optical axis of the optically anisotropic element compensates the twist of the liquid crystal layer in the alignment states of the liquid crystal layer for both the first voltage application and the second voltage application.

21. The electrooptical liquid crystal device as claimed in claim 2, claim 8 or claim 12, wherein the twist of the optical axis of the optically anisotropic element compensates the twist of the liquid crystal layer in the alignment state of the liquid crystal layer at the first voltage application.

22. The electrooptical liquid crystal device as claimed in claim 2, claim 8 or claim 12, wherein the twist of the optical axis of the optically anisotropic element compensates the optical anisotropy of the normal direction components of the substrates in the liquid crystal layer.

* * * * *